No. 616,516. Patented Dec. 27, 1898.
J. T. WILSON.
PNEUMATIC TIRE.
(Application filed Dec. 17, 1897.)
(No Model.) 2 Sheets—Sheet I.

WITNESSES
Chas. K. Davies.
R. H. Payne.

INVENTOR
John T. Wilson.
By F. E. Stebbins,
Attorney

No. 616,516. Patented Dec. 27, 1898.
J. T. WILSON.
PNEUMATIC TIRE.
(Application filed Dec. 17, 1897.)
(No Model.) 2 Sheets—Sheet 2.
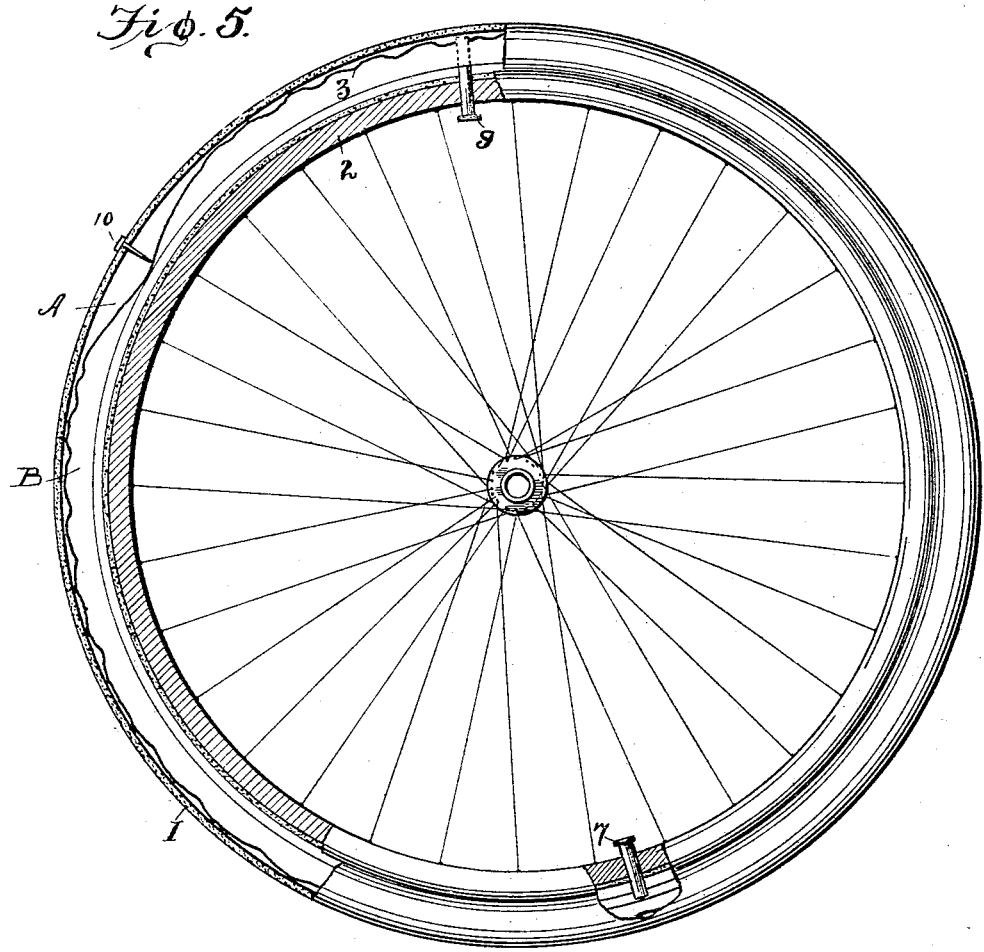
WITNESSES
Chas. K. Davies.
Geo. W. Brown
INVENTOR
John T. Wilson,
F. E. Stebbins,
Attorney

UNITED STATES PATENT OFFICE.

JOHN T. WILSON, OF JERSEY SHORE, PENNSYLVANIA.

PNEUMATIC TIRE.

SPECIFICATION forming part of Letters Patent No. 616,516, dated December 27, 1898.

Application filed December 17, 1897. Serial No. 662,262. (No model.)

*To all whom it may concern:*

Be it known that I, JOHN T. WILSON, a citizen of the United States, residing at Jersey Shore, in the county of Lycoming, State of Pennsylvania, have invented a new and useful Pneumatic Tire; and I do declare the following, taken in connection with the accompanying drawings, to be a sufficiently full, clear, and accurate description thereof as will enable persons skilled in the art to make and use the same.

The objects of my invention are, first, the production of a pneumatic tire which when the material constituting the normal tube of the same is primarily punctured will not collapse sufficiently to render the tire unfit for use, and, second, the production of a pneumatic tire which when punctured a second time can be expanded and repaired simply by the introduction of air under pressure.

With these objects in view my invention consists, first, in dividing the space on the inside of the tire into two compartments by means of a floating diaphragm which under no condition is in tension and providing means for introducing air under pressure to each compartment, and, second, it consists in dividing the space on the inside of the tire into three or more compartments by floating diaphragms which are never under tension and providing means for introducing air under pressure to each compartment.

By way of example I illustrate on the accompanying drawings the physical embodiment of my invention in connection with double and single tube tires.

Like numerals and letters of reference refer to like parts in the several views.

Figure 1:
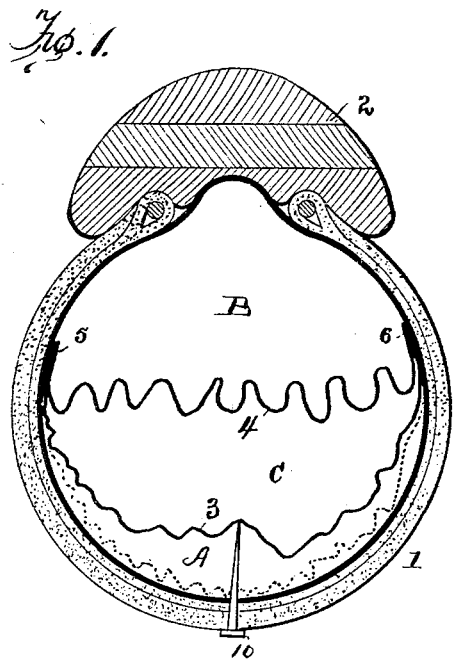
Figure 2:
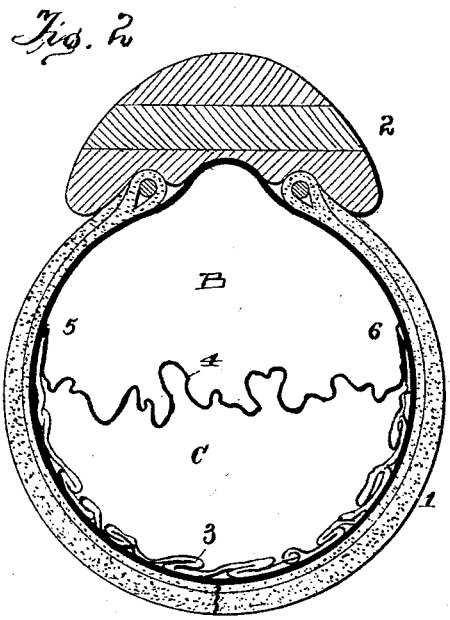
Figure 3:
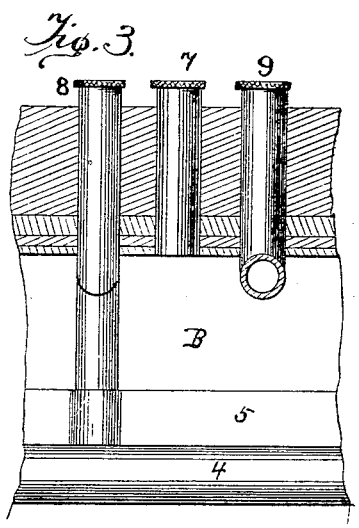
Figure 4:
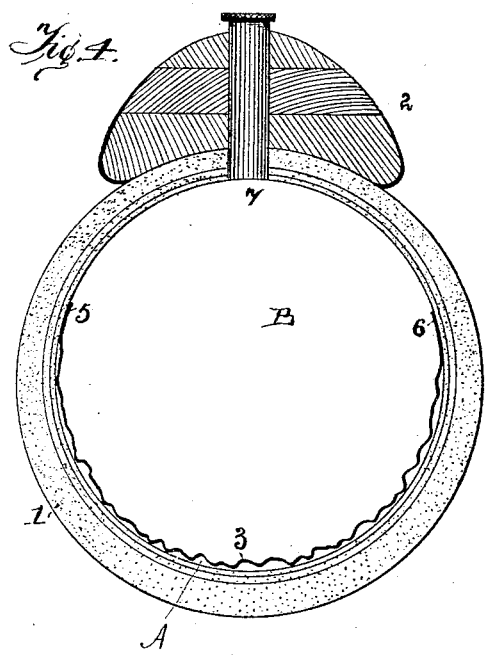

Figure 1 is an enlarged view in cross-section of a double-tube tire, showing substantially the relative location of the floating diaphragms and other elements of the tire when the same is inflated. Fig. 2 shows the position taken by the lower floating diaphragm when the compressed air has escaped from the compartment A in Fig. 1. Fig. 3 illustrates pneumatic valves separately communicating with the compartments A, B, and C in Fig. 1. Fig. 4 shows an enlarged view of a single-tube tire having a single floating diaphragm. Fig. 5 is a view of a tire in side elevation and broken away to show the diaphragm.

On the several figures of the drawings the numeral 1 designates a tube of an ordinary pneumatic tire constructed in any desirable way or manner—single or double, reinforced, or otherwise. In Figs. 1 and 2 the tube is shown as double and in Fig. 4 as single.

The element 2 is a felly.

3 and 4 are floating diaphragms, and 5 and 6 the edges of the diaphragm or diaphragms properly secured to the interior surface of the tube in any convenient way and at any points on the inside of the tube.

7 is a pneumatic valve communicating with the compartment B; 8, a like valve for introducing compressed air to compartment C; 9, a valve communicating with compartment A, and 10 represents a nail which has punctured the tube of the tire.

Each floating diaphragm may be made of rubber or of other material impervious to air. The edges 5 and 6 thereof should be located, preferably, at or above a horizontal line through the center of the tube, so as to be such a distance from the tread as will insure immunity from puncture or injury of the tube above the lines of attachment.

It will be observed that the width of each diaphragm is greater than the length of that part of the interior circumference of the tube between the lines of attachment of the edges 5 and 6 of the diaphragm, and consequently that the material of which the diaphragm is composed can never be under tension in any position which it may occupy relative to other parts of the tire.

In inflating the tire a smaller volume of air is to be introduced into the compartment A than in the other compartment or compartments, so that when completely inflated the diaphragm 3 will occupy a position close to but not in contact with the part of the tube adjacent the tread. The dotted line in Fig. 1 and the full line in Fig. 4 show its approximate normal position relative to the tread. This diaphragm having air on both sides is balanced or in equilibrium and "floats," and is, moreover, not under tension in the least degree. Being out of frictional contact with that part of the tube which is successively and repeatedly pressed inwardly and displaced when the tread comes in contact with the earth during the revolution of the tire, it is not abraded or subject to wear, and hence is very durable.

Should the tube become punctured by a nail, as shown in Figs. 1 and 5, or by some other like object, the point entering the compartment A will strike the diaphragm 3, and inasmuch as the diaphragm floats it will easily move from the position shown in dotted lines to the position in full lines, or to any other position within the tube without being penetrated. It often occurs that many punctures are inflicted by one puncturing agent by reason of continued revolution of the wheel before it is known to be punctured. In such a case the diaphragm 3 prevents laceration and the puncturing agent is powerless to injure the diaphragm so long as the air in the compartment A is prevented from escaping by the presence of the puncturing agent in the outer tube 1. After the nail has been withdrawn the small volume of air in compartment A will escape and its place be filled by the expansion of the large volume of compressed air in the other compartment or compartments and the diaphragm 3 be automatically forced into contact with the interior surface of the tube, as shown in Fig. 2. In this latter position it will be observed that the material of the diaphragm 3 lies in folds and is not under tension and, moreover, will cover the hole made by the nail or other object. As the quantity of air in the compartment A is not great, the expansion of the compressed air in the other compartment or compartments will not materially affect the tension of the tube, at least not enough to render the tire unfit for use, and automatic healing is accomplished. It is obvious that should the tube be cut open by a piece of glass or other sharp-edged object the air escaping from the compartment A will immediately occasion a movement of the said diaphragm 3 into contact with the interior surface of the tube, as shown in Fig. 2, and prevent a collapse of the tire and consequent accident or injury to wheel or rider before the vehicle could be stopped.

If the tube be punctured or cut open a second time and a rent also be made in the diaphragm 3 as it lies against the interior surface of the tube, the compressed air escaping from compartment C will occasion the expansion of the compressed air in compartment B and the forcing of the floating diaphragm 4 outwardly upon and in close contact with the diaphragm 3. Under these conditions the introduction of additional compressed air to the compartment B will restore the tire to the proper degree of inflation for use. However, in some cases the air will not escape from compartment C appreciably, inasmuch as the hole in the tube and that in the diaphragm 3 will not register, the folds of the diaphragm allowing it to shift or move to one side.

While I have shown my invention by way of example embodied in connection with double and single tube tires as originally constructed, I do not limit the scope thereof to such embodiment, inasmuch as I may apply it in other ways and forms—for example, to tires already constructed or in use by adding to the said tires my novel diaphragm or diaphragms or by introducing within the same an auxiliary tube and attaching it so that edges 5 and 6 will coincide or have my novel diaphragm or diaphragms. Moreover, many minor variations in construction may be introduced in connection with my improvement and the relative location of the several elements of the tire and diaphragm or diaphragms be changed without constituting a substantial departure.

What I claim as new, and desire to secure by Letters Patent, is—

1. A pneumatic tire having a "floating" diaphragm which divides the space on the inside of the tube into two compartments, the width of the said diaphragm being greater than the length of that part of the interior circumference of the tube extending between the points of attachment of the edges of the said diaphragm; and means for introducing air under pressure into both compartments, the compartment adjacent the tread of the tire normally containing a less quantity of compressed air than the other compartment; whereby when the tire is inflated the diaphragm may be in equilibrium and "float" and occupy a position close to but not in contact with the inner surface of the tube of the tire; and whereby when the compressed air escapes from one compartment the diaphragm may be automatically or otherwise forced in contact with the inner surface of the tube and not be under tension; in substance as set forth.

2. A pneumatic tire having a plurality of "floating" diaphragms which divide the space on the inside of the tube into a plurality of compartments, the width of each diaphragm being greater than that part of the interior circumference of the tube extending between the points of attachment of the edges of the diaphragm; and means for introducing air under pressure into each compartment, the diaphragm adjacent the tread normally occupying a position close to but not in contact with the inner surface of the tube of the tire, the diaphragms being never under tension; in substance as and for the purposes set forth.

J. T. WILSON.

Witnesses:
S. E. BICKELL,
WM. R. PEOPLES.